United States Patent [19]
Ito et al.

[11] Patent Number: 5,748,880
[45] Date of Patent: May 5, 1998

[54] COMPUTER-SUPERVISING SYSTEM

[75] Inventors: Yutaka Ito, Nagoya; Naoko Egawa, Inazawa; Shogo Unai; Tadashi Murase, both of Nagoya, all of Japan

[73] Assignee: Fujitsu Limited, Kawasaki, Japan

[21] Appl. No.: 718,017

[22] Filed: Sep. 3, 1996

Related U.S. Application Data

[63] Continuation of Ser. No. 370,852, Jan. 10, 1995, abandoned.

[30] Foreign Application Priority Data

Mar. 15, 1994 [JP] Japan .................................. 6-043727

[51] Int. Cl.$^6$ .................................................. G06F 11/00
[52] U.S. Cl. ............................ 395/183.22; 395/185.1; 395/181
[58] Field of Search ......................... 395/185.01, 185.1, 395/184.01, 183.22, 181, 182.13, 183.02

[56] References Cited

U.S. PATENT DOCUMENTS

| | | | |
|---|---|---|---|
| 3,575,589 | 4/1971 | Neeman et al. | 395/181 |
| 4,412,802 | 11/1983 | Fujinami et al. | 395/575 |
| 4,881,230 | 11/1989 | Clark et al. | 371/20.1 |
| 4,922,491 | 5/1990 | Coale | 371/16.5 |
| 4,964,125 | 10/1990 | Kim | 371/15.1 |
| 5,047,977 | 9/1991 | Hill et al. | 395/185.1 |
| 5,090,014 | 2/1992 | Polich et al. | 371/15.1 |
| 5,161,158 | 11/1992 | Chakravarty et al. | 371/15.1 |
| 5,167,010 | 11/1992 | Elm et al. | 395/50 |
| 5,237,677 | 8/1993 | Hirosawa et al. | 395/575 |
| 5,337,320 | 8/1994 | Kung | 395/575 |
| 5,369,756 | 11/1994 | Imura et al. | 395/183.22 |
| 5,423,000 | 6/1995 | Kimura et al. | 395/185.1 |
| 5,440,688 | 8/1995 | Nishida | 395/182.02 |
| 5,448,722 | 9/1995 | Lynne et al. | 395/650 |
| 5,467,449 | 11/1995 | Gauronski et al. | 395/185.1 |
| 5,596,712 | 1/1997 | Tsuyama et al. | 395/183.02 |

FOREIGN PATENT DOCUMENTS

| | | | |
|---|---|---|---|
| 0 456 395 | 11/1991 | European Pat. Off. | G06F 11/30 |
| 0 573 686 | 12/1993 | European Pat. Off. | G06F 15/16 |

OTHER PUBLICATIONS

Lee "A Taxonomy of Uses of Interaction History", Graphics Interface Proceedings, pp. 113–122, 1990.

*Primary Examiner*—Robert W. Beausoliel, Jr.
*Assistant Examiner*—Joseph E. Palys
*Attorney, Agent, or Firm*—Staas & Halsey

[57] ABSTRACT

A computer-supervising system includes a centralized supervisor unit for supervising numerous computers connected to each other via a network. The computer-supervising system further includes a recovery procedure-storing device for storing recovery procedures corresponding to faults of the computers, respectively; a message display device for displaying error messages corresponding to the faults, respectively, on a display screen, together with classification data added thereto by the computers; a fault-selecting device for selecting one of the error messages displayed on the display screen, according to an operation of an operator; a recovery procedure display device for reading one of the recovery procedures stored in the recovery procedure-storing device based on the selected one error message which corresponds to one of the faults, and for displaying the read one recovery procedure on the display screen; and a recovery-executing device for executing, by an operation of the operator, the read and displayed one recovery procedure to recover from the one fault corresponding to the selected one error message. The system further includes a recovery history-storing device for storing recovery procedures previously executed by the recovery-executing device; a recovery history-selecting device for selecting one of the recovery procedures stored in the recovery history-storing device, according to an operation of the operator; and a recovery history display device for displaying the selected one recovery procedure on the display screen.

4 Claims, 11 Drawing Sheets

COMPUTER-SUPERVISING SYSTEM

This application is a continuation of application Ser. No. 08/370,852, filed Jan. 10, 1995, now abandoned.

BACKGROUND OF THE INVENTION

1. Field of the Invention

This invention relates to a computer-supervising system for supervising a large number of computers under supervision connected to each other via a network, by the use of a centralized supervisor unit, and more particularly to a computer-supervising system of this kind for carrying out recovery from faults notified by error messages.

2. Description of the Related Art

Conventionally, among computer-supervising systems for supervising a large number of computers connected to each other via a network, such as a LAN, by the use of a centralized supervisor unit, a system is known, in which subordinate computers are supervised by superordinate computers for faults, and further the superordinate computers are supervised by a centralized highest-order computer for faults.

Figure 11:
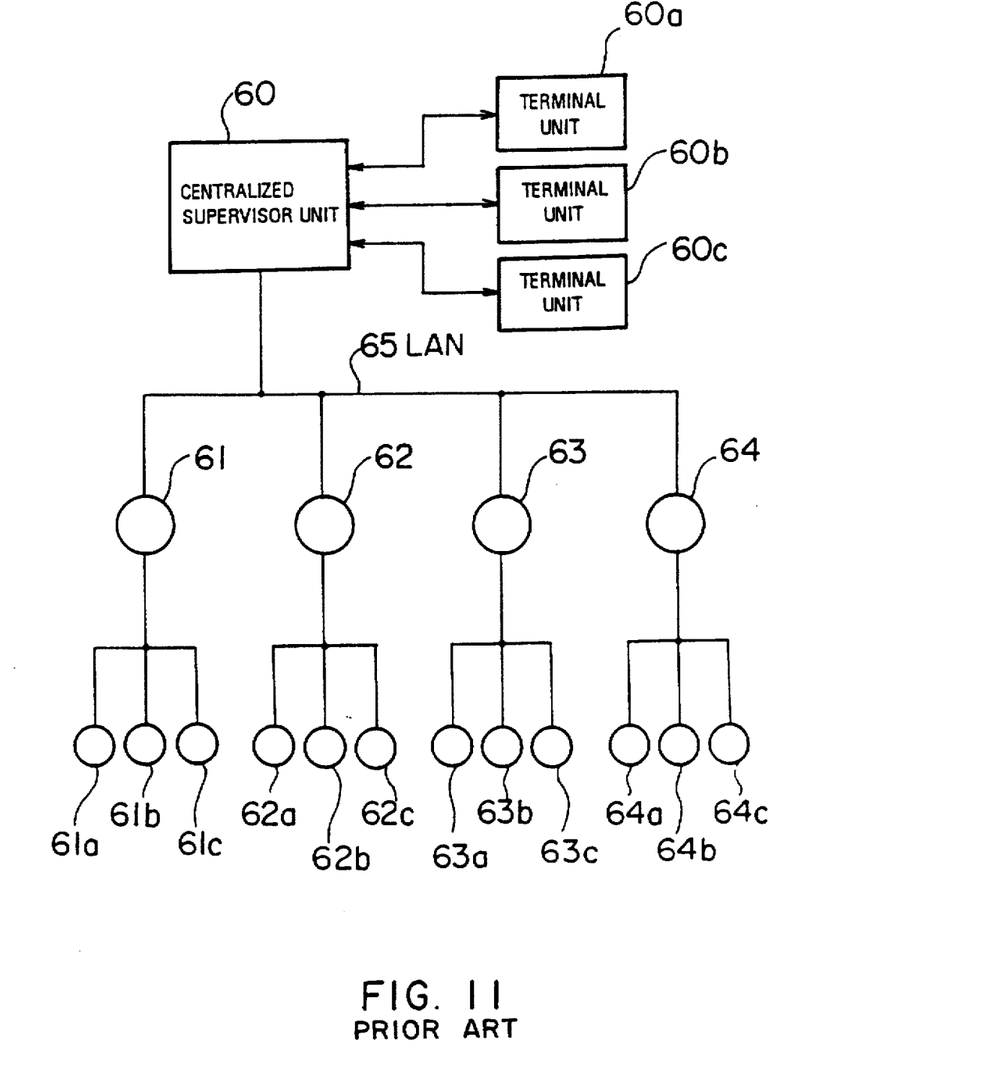
FIG. 11 (PRIOR ART) is a diagram showing the construction of a conventional computer-supervising system.

FIG. 11 shows the arrangement of a conventional computer-supervising system. A centralized supervisor unit 60 for supervising the whole network is connected to computers 61, 62, 63, 64 under supervision via a LAN (Local Area Network) 65. These computers 61, 62, 63, 64 are connected to computers 61a, 61b, and 61c, computers 62a, 62b, and 62c, computers 63a, 63b, and 63c, and computers 64a, 64b, and 64c, as respective groups of subordinate computers. Further, if circumstance requires, a plurality of computers are connected as ones of a still lower order to these subordinate computers.

The superordinate computers 61, 62, 63, 64 detect faults occurring in their subordinate computers and themselves, and send the results of detection to the centralized supervisor unit 60. The centralized supervisor unit 60 has a plurality of terminal units 60a, 60b, 60c connected thereto. These terminal units 60a, 60b, 60c are each provided with a keyboard and a display device, neither of which is shown, and operated by operators in various ways.

In such a computer network, if a fault occurs in any of the computers, an error message corresponding to the fault is displayed on the display devices of the terminal units 60a, 60b, 60c of the centralized supervisor unit 60. An operator who recognized the error message carries out recovery from the fault through intervention or the like.

According to the conventional computer-supervising system, however, error messages are not presented in such a form as will enable an operator to understand a classification of the error message at sight, and therefore, he is required to be well informed of the correspondence of error messages to faults, which prevents an ordinarily-skilled operator from promptly confirming the existing abnormality.

Further, it has been conventionally required of the operator to grasp recovery procedures for recovery from all the faults. Further, even with faults of the same kind, if different recovery procedures are required for different computers, the operator is required to be aware of so many procedures for recovery from the faults, which prevents the operator from promptly effecting recovery from such faults.

Further, conventionally, recovery operations once performed on faults are not recorded, and hence even if the operator is to carry out recovery from a fault by the same recovery procedure required for recovery from a fault encountered in the past, he has to carry out the recovery by recollecting how he carried out the recovery in the past, on each occasion. This can also prevent the operator from promptly effecting recovery from faults.

SUMMARY OF THE INVENTION

The present invention has been made in view of these circumstances, and the object thereof is to provide a computer-supervising system which makes it possible to confirm a type of a fault, and effect recovery from the fault, more promptly.

To attain the above object, the present invention provides a computer-supervising system including a centralized supervisor unit for supervising a large number of computers under supervision connected to each other via a network. The computer-supervising system comprises recovery procedure-storing means for storing recovery procedures corresponding to faults, message display means for displaying error messages corresponding to the faults on a display screen, together with classification data added thereto by the computers under supervision, fault-selecting means for selecting a fault to be recovered from out of the faults notified by the error messages, according to an operation of an operator, recovery procedure display means for reading a recovery procedure for carrying out recovery from the selected fault from the recovery procedure-storing means and displaying the recovery procedure for carrying out the recovery from the selected fault on the display screen, recovery-executing means for executing the recovery by an operation of the operator according to the recovery procedure for carrying out the recovery from the selected fault, recovery history-storing means for storing histories of recoveries executed by the recovery-executing means, recovery history-selecting means for selecting a history of a recovery to be displayed out of the histories of the recoveries stored in the recovery history-storing means, according to an operation of the operator, and recovery history display means for displaying the selected history of the recovery on the display screen.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The embodiment of the invention will now be described with reference to drawings showing the embodiment thereof.

Figure 1:
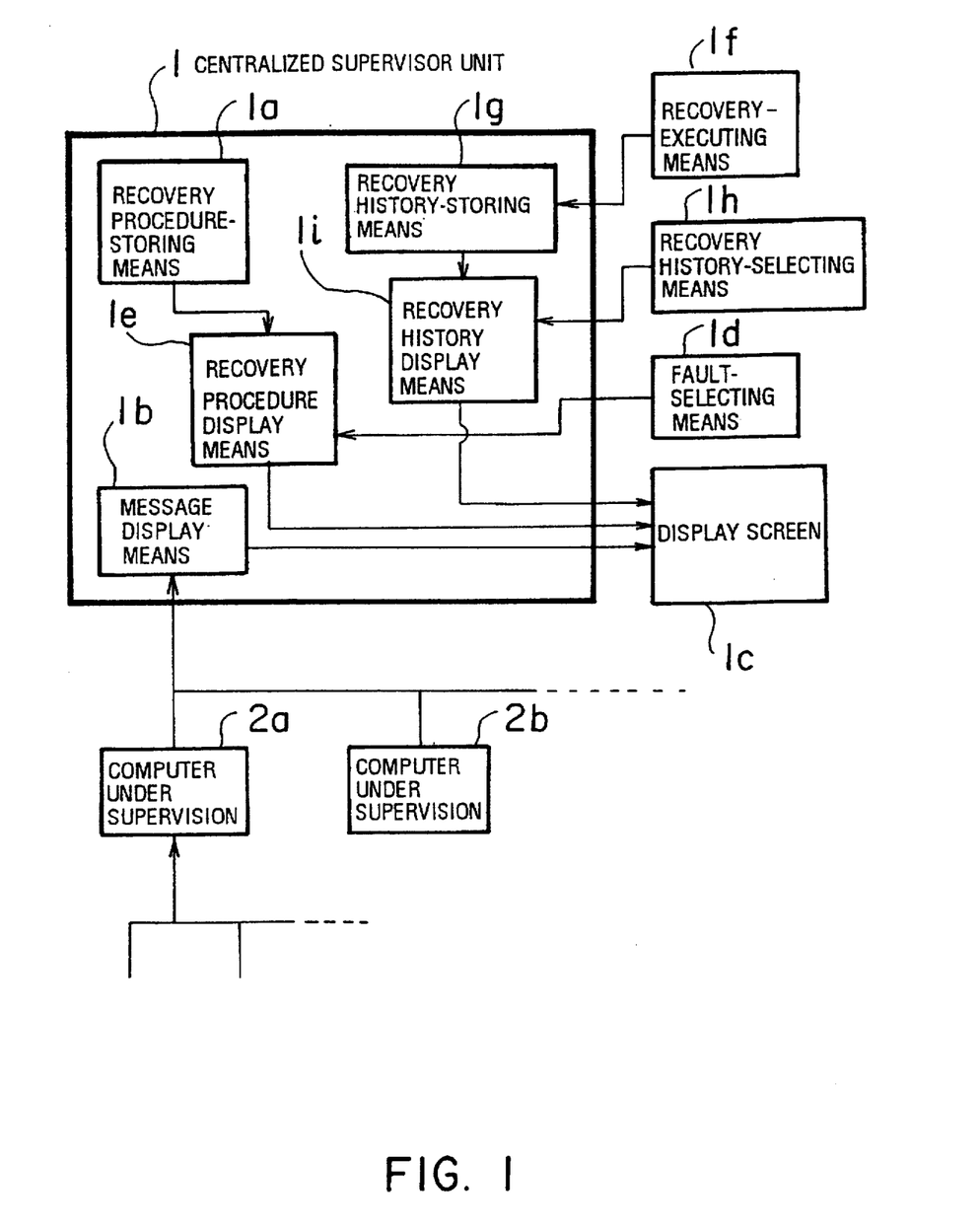
FIG. 1 is a diagram which is useful in explaining principles of a computer-supervising system according to the invention.

FIG. 1 shows principles of the computer-supervising system according to the invention. The recovery procedure-storing means 1a for storing recovery procedures corresponding to faults is provided in the centralized supervisor unit 1. The message display means 1b displays error messages corresponding to faults on the display screen 1c together with classification data added thereto by computers 2a, 2b, . . . which are under supervision. When the fault-selecting means 1d selects a fault to be recovered from out of faults on which error messages are displayed, in response to an operation of the operator, the recovery procedure display means 1e reads out a recovery procedure for recovery from the selected fault from the recovery procedure-storing means 1a to display same on the display screen 1c.

The recovery-executing means if executes a recovery from a fault in response to operations of the operator according to the displayed recovery procedure, and the recovery history-storing means 1g stores a history of steps of the recovery executed by the recovery-executing means 1f. The recovery history-selecting means 1h selects a recovery history to be displayed, out of histories of recoveries stored in the recovery history-storing means 1g in response to an operation of the operator. The recovery history display means 1i displays the selected recovery history on the display screen 1c.

Figure 2:
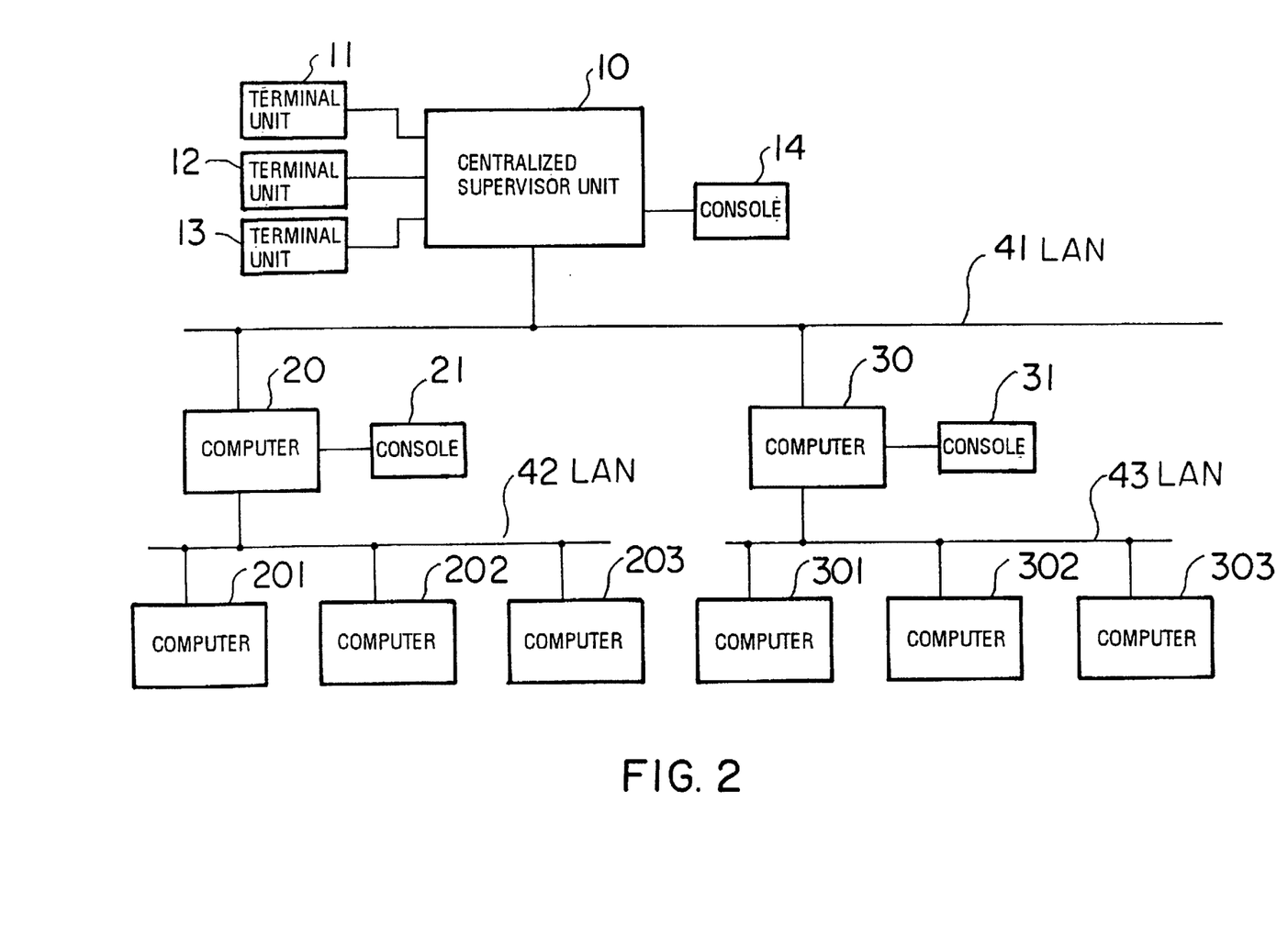
FIG. 2 is a diagram showing an example of a computer network to which the computer-supervising system according to the invention is applied.

FIG. 2 shows an example of a computer network to which the computer-supervising system according to the invention is applied. A centralized supervisor unit 10 for supervising the whole network is connected to computers 20, 30, and other computers, not shown, under supervision, via a LAN 41. The computers 20, 30 are provided with consoles 21, 31, respectively. Further, the computers 20, 30 are connected via LAN's 42 and 43, to computers 201, 202 and 203, and 301, 302, and 303, as respective computer groups. Each of the computers 201, 202, 203, 301, 302, and 303 is also provided with a console, not shown.

The centralized supervisor unit 10 is provided with three terminal units 11, 12, 13, and a console 14. A display screen, not shown, of each of the terminal units 11, 12, 13 displays an error message screen and so forth, described hereinafter. Operators carry out recovery from faults by way of a keyboard, a mouse, and the like, neither of which is shown, provided for each of the terminal units 11, 12, 13. The centralized supervisor unit 10 has a construction centered round a processor, and performs computer-supervising operations according to a system program installed therein.

The computers 20, 30, and so forth each have a construction centered round a processor, similarly to the centralized supervisor unit 10, and perform supervising operations, referred to hereinafter, according to a system program installed therein.

Figure 3:
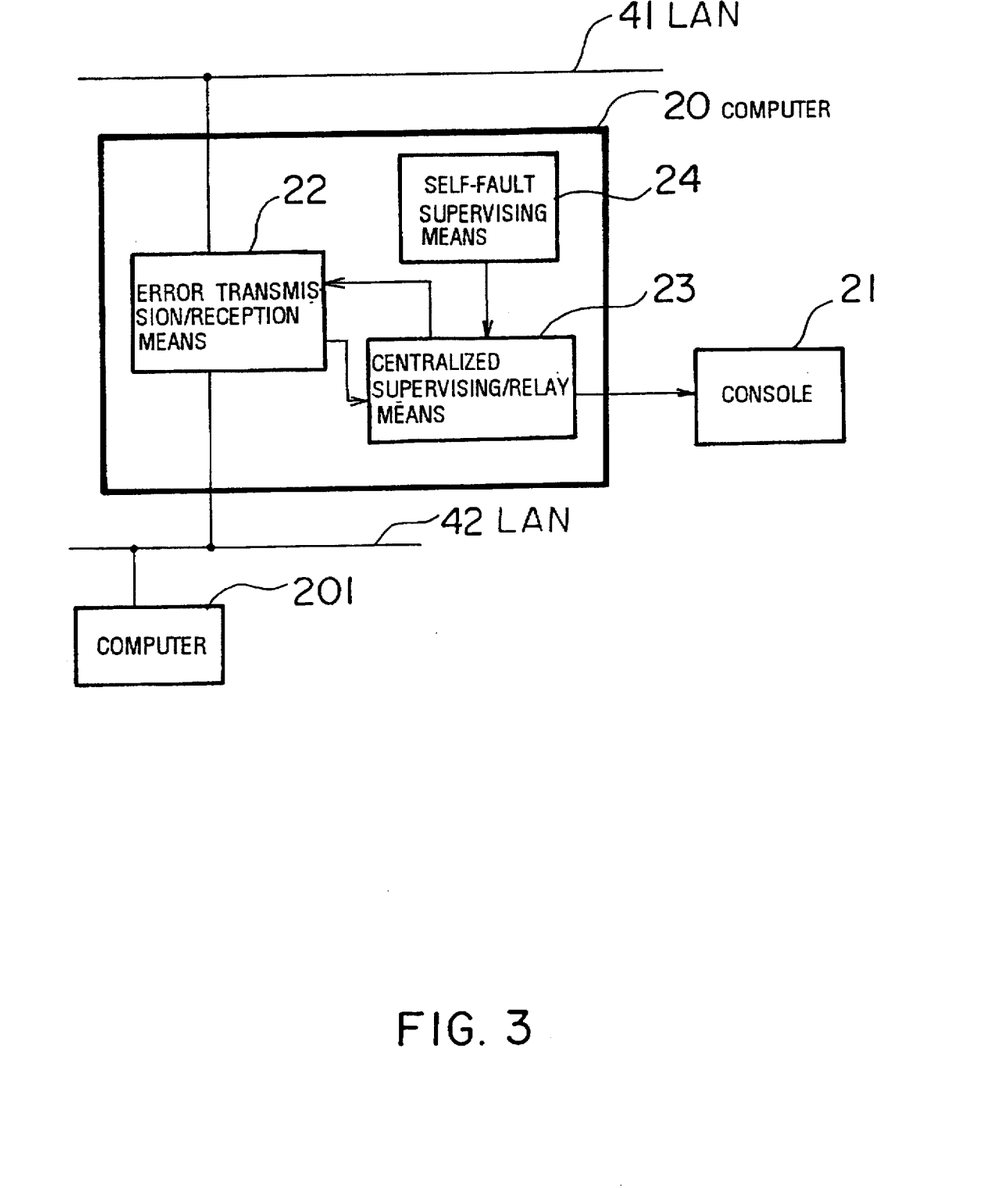
FIG. 3 is a block diagram showing the construction of a supervising function of a computer under supervision.

FIG. 3 is a block diagram showing the construction of a supervising function of the computer 20 under supervision.

The supervising function of the computer 20 is mainly achieved by error transmission/reception means 22, centralized supervising/relay means 23, and self-fault supervising means 24. The error transmission/reception means 22 receives error message s sent from the subordinate computer 201 and so forth, and supplies them to the centralized supervising/relay means 23.

The self-fault supervising means 24 supervises the computer 20 itself for faults, and sends an error message to the centralized supervising/relay means 23 when a fault occurs. Upon reception of the error message, the centralized supervising/relay means 23 adds classification data to the error message, and sends them to the error transmission/reception means 22. Further, the centralized supervising/relay means 23 relays the error messages from the subordinate computer 201 and so forth to the error transmission/reception means 22. To these error messages from the computer 201 and so forth, classification data have already been added by respective centralized supervising/relay means of the computer 201 and so forth. The error transmission/reception means 22 sends the error messages with the classification data added thereto to the centralized supervisor unit 10 via the LAN 41.

In addition, the computer 20 alone is described here in respect of its construction of the supervising function, but the other computers 30, 201, 202, 203, 301, 302, and 303 are also similarly constructed.

Figure 4:
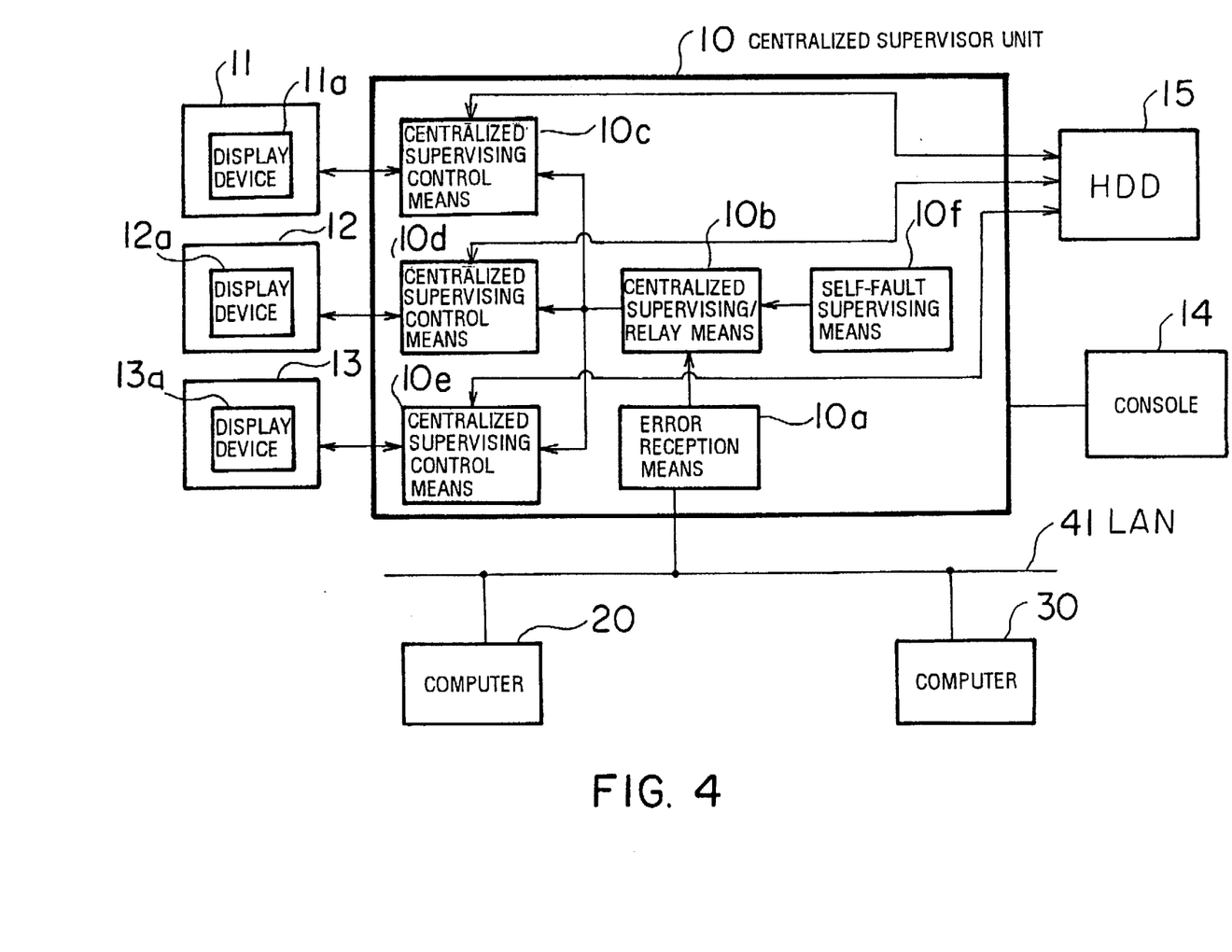
FIG. 4 is a block diagram showing the construction of a supervising function of a centralized supervisor unit.

FIG. 4 shows the construction of a supervising function of the centralized supervisor unit 10. Error reception means 10a receives the error messages sent from the computers 20, 30 under supervision and sends them to centralized supervising/relay means 10b. The centralized supervising relay means 10b sends these error message s to centralized supervising control means 10c, 10d, 10e. Self-fault supervising means 10f supervises the centralized supervisor unit 10 itself for faults, and when a fault occurs, the self-fault supervising means 10f sends an error message to the centralized supervising/relay means 10b. Upon reception of this error message, the centralized supervising/relay means 10b adds classification data thereto, and sends them to the centralized supervising control means 10c, 10d, 10e.

The centralized supervising control means 10c, 10d, 10e control recovery operations in cooperation with the terminal units 11, 12, 13. The centralized supervising control means 10c, 10d, 10e send the fault messages sent from the centralized supervising/relay means 10b to the terminal units 11, 12, 13. The centralized supervising control means 10c, 10d, 10e read in data of recovery procedures stored in a hard disk drive (HDD) 15 and send same to the terminal units 11, 12, 13. Upon reception of these data, the terminal units 11, 12, 13 display the fault messages and classification thereof on display devices 11a, 12a, and 13a thereof. Examples of these displays will be described hereinafter.

The terminal units 11, 12, 13 are each attended by an operator, who recognizes fault messages and their classifications, and then performs a recovery operation as desired. A procedure of recovery operations by each operator is sent to a corresponding one of the centralized supervising control means 10c, 10d, 10e, and further to the hard disk drive 15 for storage therein.

The centralized supervising control means 10c, 10d, 10e described above with reference to FIG. 4 each correspond to all of the message display means 1b, the recovery procedure display means 1e, and the recovery history display means 1i. Further, the hard disk drive 15 corresponds to the recovery procedure-storing means 1a and the recovery history-storing means 1g. Further, the terminal units 11, 12, 13 each correspond to all of the fault-selecting means 1d, the recovery-executing means 1f, and the recovery history-selecting means 1h.

Figure 5:
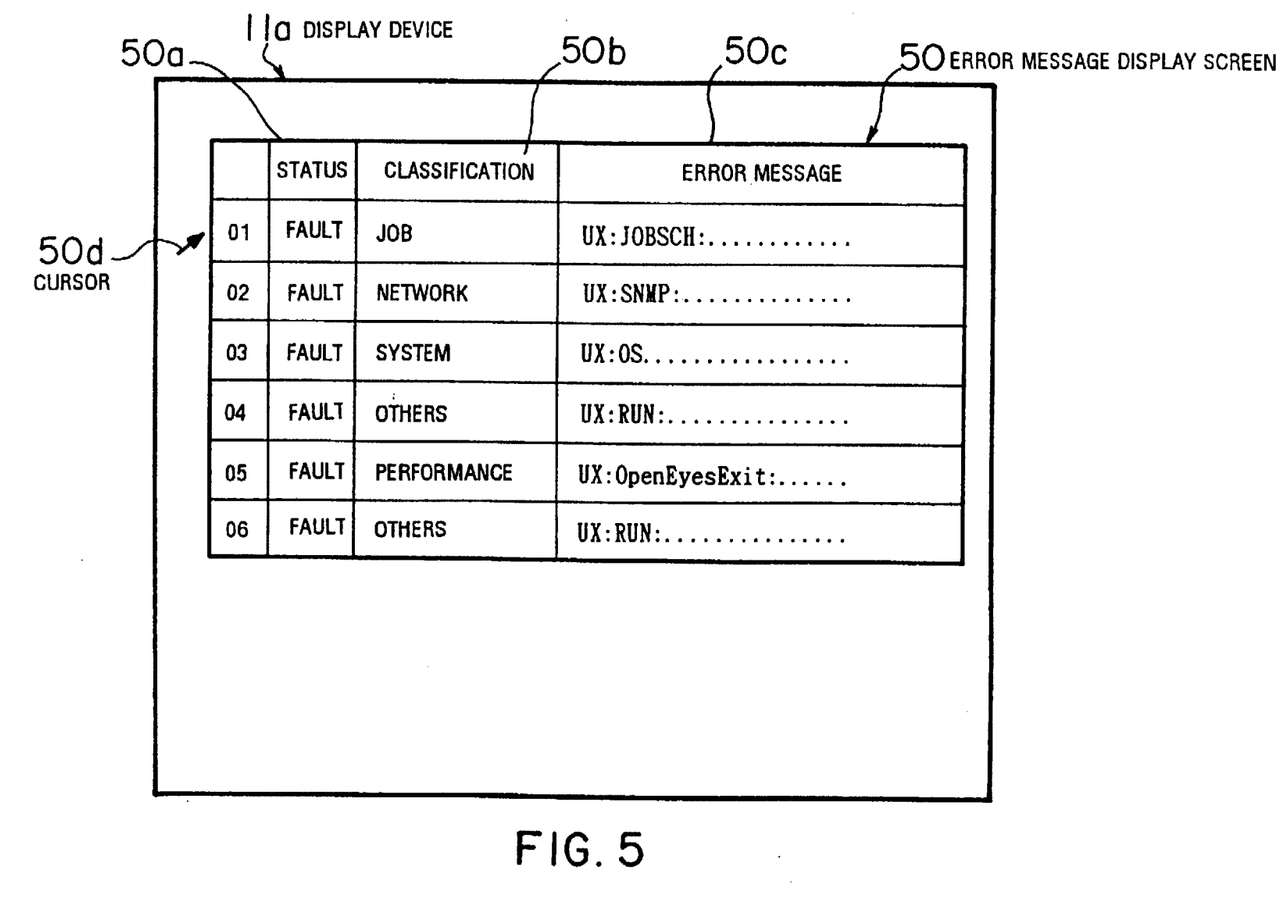
FIG. 5 is a diagram showing an example of an error message display screen displayed on a display device of each terminal unit.

FIG. 5 shows an example of an error message display screen presented on each of the display devices 11a, 12a, 13a of the terminal units 11, 12, 13. Here, description will be made on the display device 11a. When a fault occurs in the network, an error message display screen 50 of the display device 11a indicates an error message on the fault having just occurred. This error message is also indicated on the other display devices 12a, 13a, at the same time. The error message display screen 50 is mainly formed of a status column 50a, a classification column 50b, and a message column 50c.

The status column 50a displays a status of recovery processing effected on each fault, and indicates "FAULT" when the recovery processing has not been effected. Further, when the recovery is pending, "PENDING" is indicated, and when the recovery is being carried out via any of the terminal units, "RECOVERING" is indicated. Further, when the recovery is completed, "RECOVERED" is indicated. This enables the operator to recognize not only the status of recovery processing carried out via his own terminal unit but also the statuses of recovery processing carried out via the other terminal units 12, 13, which prevents recovery operations from being overlapped.

The classification column 50b indicates a category to which each error message of the message column 50c belongs, i.e, a system category, a network category, a job category, or a performance category. If an error message does not correspond to any of these categories, "OTHERS" is indicated.

An operator attending on the terminal unit 11 selects a display zone (or row) of an error message on a fault for which he wishes to carry out recovery operations, by the use of a cursor 50d. When the selection is effected, a recovery operation screen is displayed on the display screen.

Figure 6:
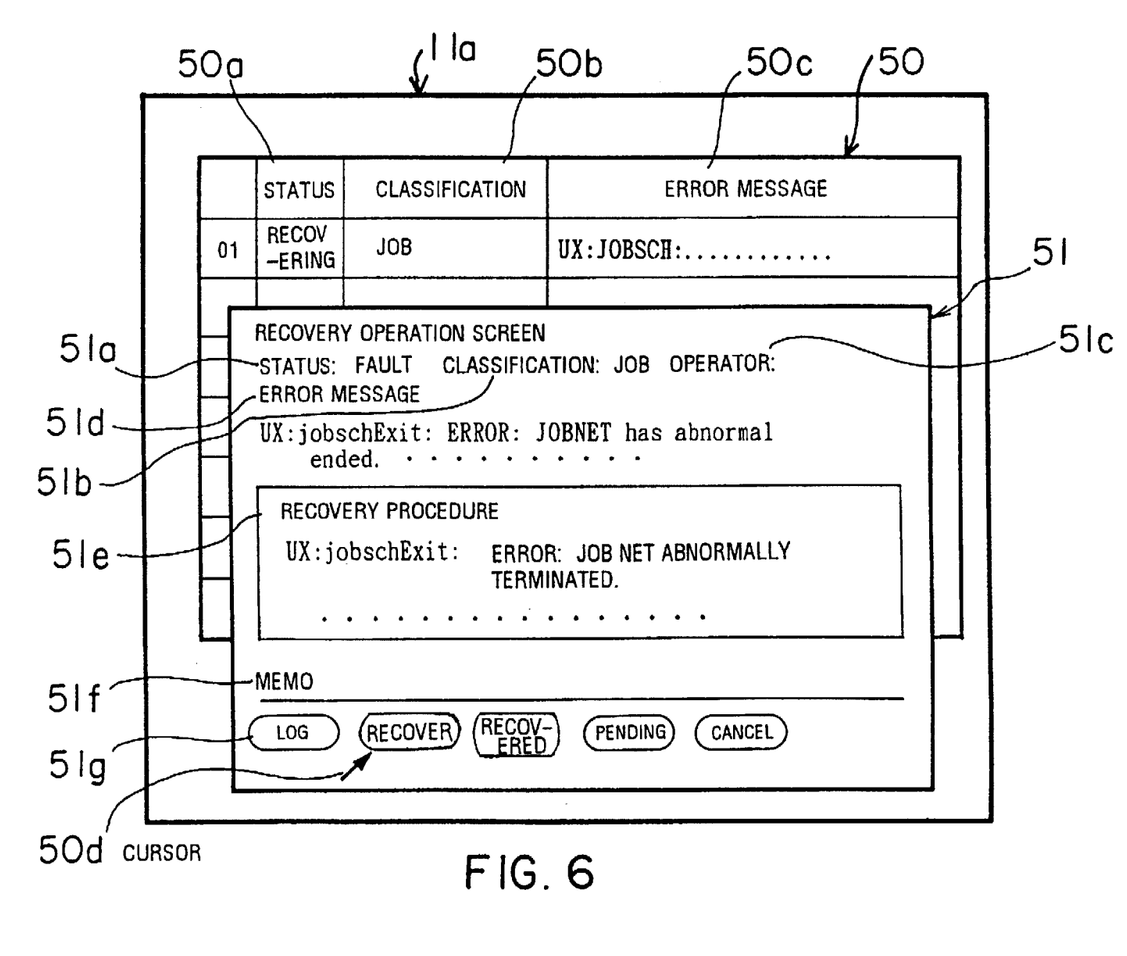
FIG. 6 is a diagram showing an example of a recovery operation screen displayed.

FIG. 6 is a diagram showing an example of the recovery operation screen. Let it be assumed here that an error message corresponding to Number 01 is selected for recovery. The recovery operation screen 51 is displayed on the error message display screen 50 in the form of a window. At this time, the status column 50a of the error message display screen 50 is changed over to "RECOVERING". This changeover is also effected on the other terminal units 12, 13. The recovery operation screen 51 is mainly formed of a status indication area 51a, a classification indication area 51b, an operators's name area, a message indication area 51d, the recovery procedure indication area 51e, a memo area 51f and a menu indication area 51g.

On the status indication area 51a is displayed the same indication having appeared on the status column 50a of the error message display screen 50 before the recovery operation screen 51 is started. On the classification indication area 51b and the message indication area 51d, there are displayed the same indications that appear on the classification column 50a and the message column 50c of the error message display screen 50. The name of an operator having carried out the recovery, if any, is written into the operator's name area 51c. The recovery procedure corresponding to the selected error message is read from the hard disk drive 15 and displayed on the recovery procedure indication area 51e. The operator can enter his comments into the memo area 51f.

Figure 7:
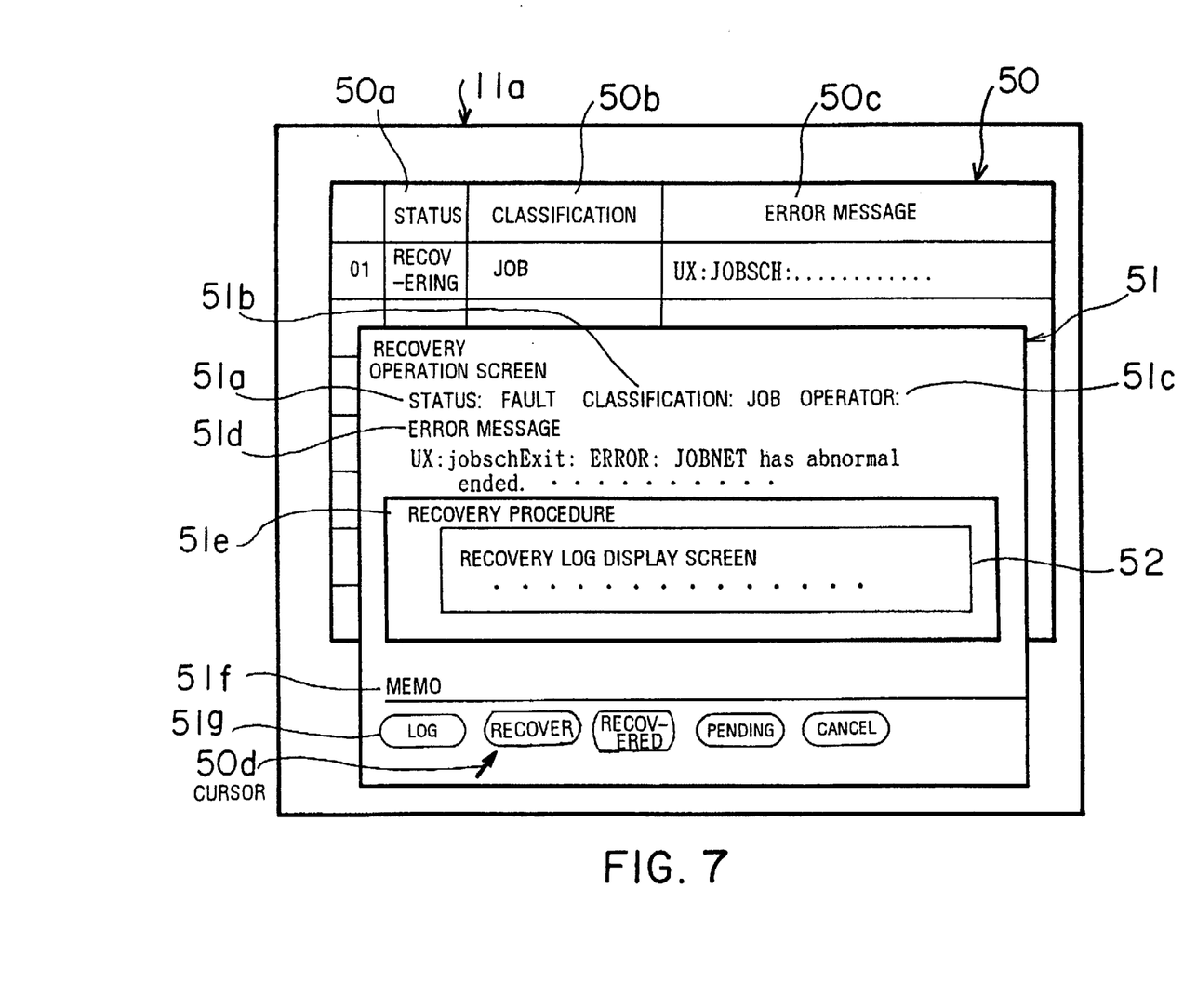
FIG. 7 is a diagram showing an example of a recovery log display screen displayed.

The menu indication area 51g displays a menu of functions utilized in recovery from the fault. If "LOG" is selected by the cursor 50d, a log (recovery history) of the preceding recovery operation corresponding to the selected error message is read from the hard disk drive 15, and displayed on the recovery procedure indication area 51e, as shown in FIG. 7, as a window of a recovery log display screen 52. The operator performs operations according to indications on the recovery procedure indication area 51e or the recovery log display screen 52, to execute recovery from the fault.

When the recovery is completed, the operator selects "RECOVERED" on the menu indication area 51g. In response to the selection, the recovery operation screen 51 is terminated, and the status column 50a of the error message display screen 50 is changed from "RECOVERING" TO "RECOVERED". This change of indications is also effected on the other terminal units 12, 13.

During the work of recovery, if the operator wishes to make pending the status of the error message to carry out some other processing, he can select "PENDING" on the menu indication area 51g by the cursor 50d, whereby the corresponding indication on the status column 50a of the error message display screen 50 is changed to "PENDING". Further, all the present recovery processing steps can be canceled by selecting "CANCEL" on the menu indication area 51g. Naturally, at this time, indications on corresponding areas of the display screens of the other terminal units 12 and 13 are also changed over.

Thus, when the recovery from the fault is finished, a recovery log registration screen is displayed on the recovery from operation display screen 51, for registering a recovery log.

Figure 8:
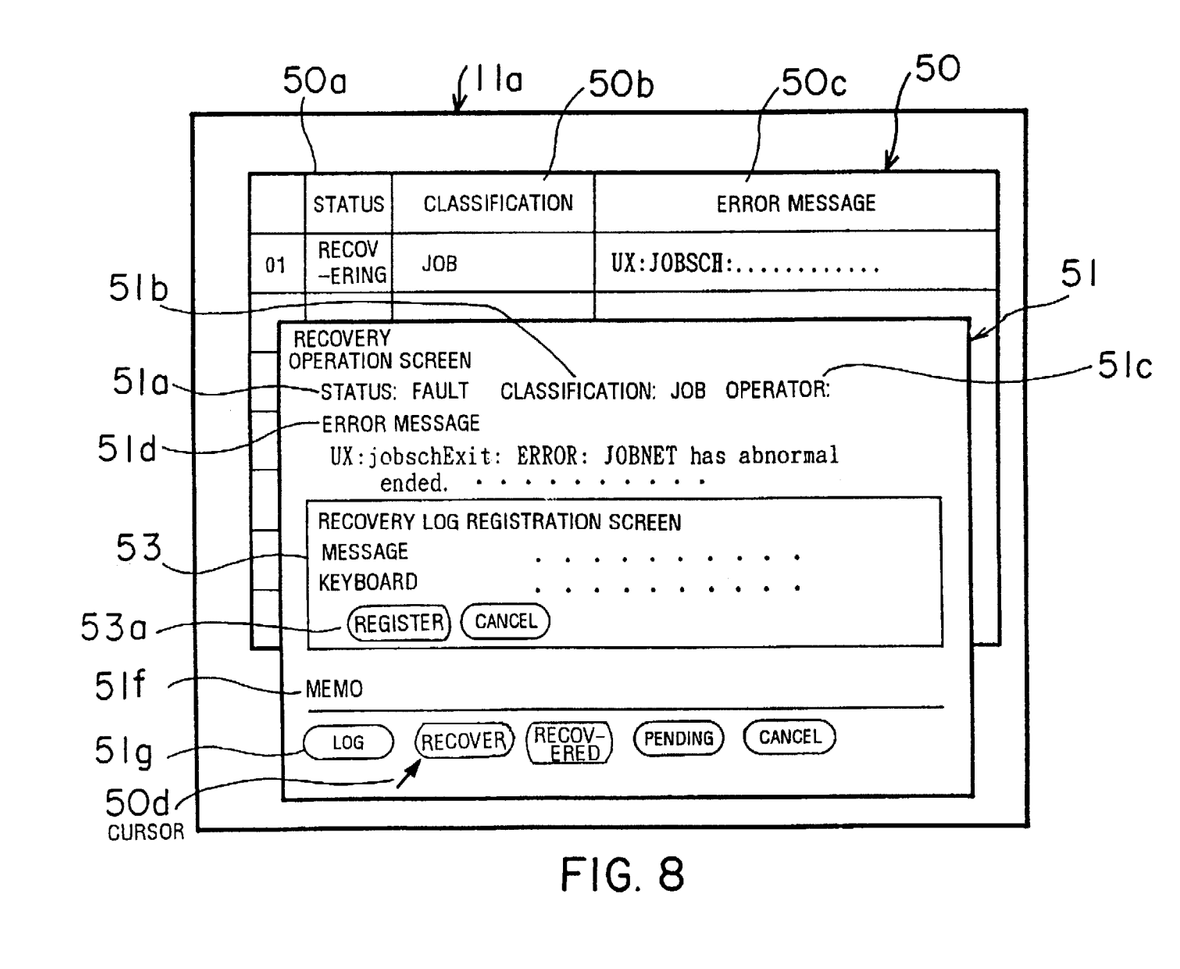
FIG. 8 is a diagram showing an example of a recovery log registration screen displayed.

FIG. 8 shows an example of the recovery log registration screen displayed. In FIG. 8, reference numeral 53 designates the recovery log registration screen which is displayed on the recovery operation screen 51 in the form of a window. Via the recovery log registration screen 53, instructions are given as to whether the recovery log should be registered or not. To effect registration, "REGISTER" is selected by the cursor 50d, whereas if not, "CANCEL" is selected by same. Thus, the procedure of steps of the present recovery is stored into the hard disk drive 15. The data stored can be displayed on the recovery log display screen 52 shown in FIG. 7 by selecting "LOG" of the menu indication area 51g when recovery operation for the same fault message is carried out on a subsequent occasion.

Figure 9:
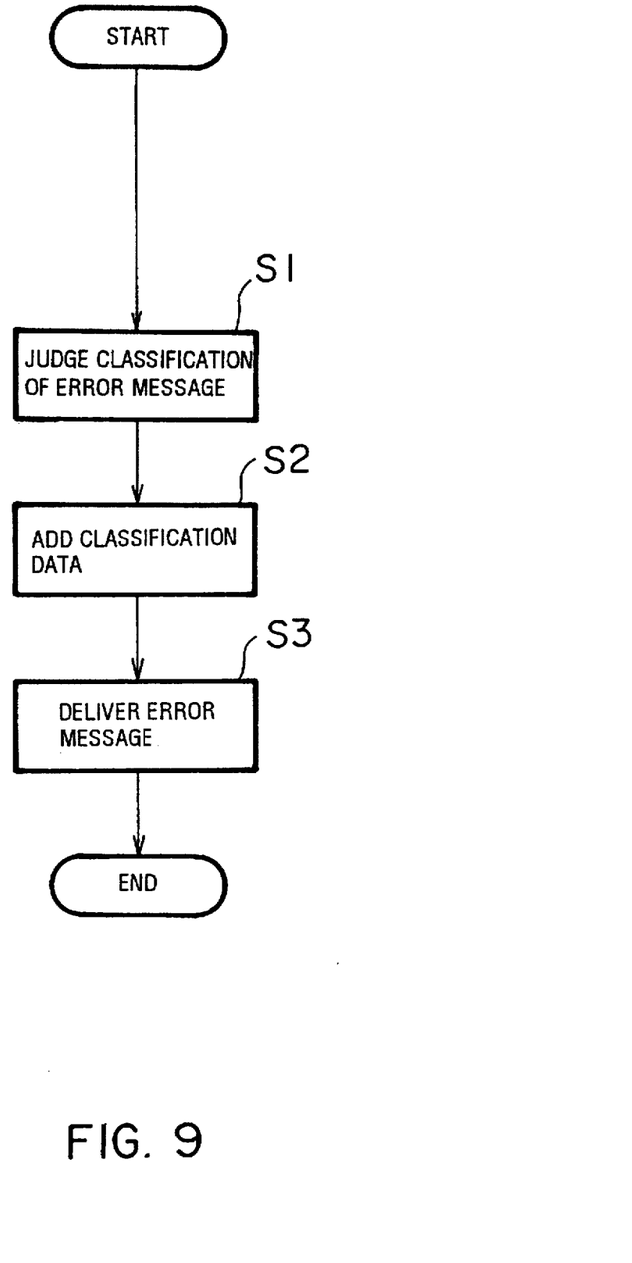
FIG. 9 is a flowchart showing procedures of processing executed by a computer under supervision for sending an error message.

FIG. 9 shows a program of processing executed by a computer under supervision for sending an error message. This program is started upon occurrence of a fault.

[S1] A classification of an error message is judged.

[S2] Classification data is added to the fault message.

[S3] The error message and the classification data added thereto are sent to a superordinate computer or to the centralized supervisor unit 10.

Figure 10:
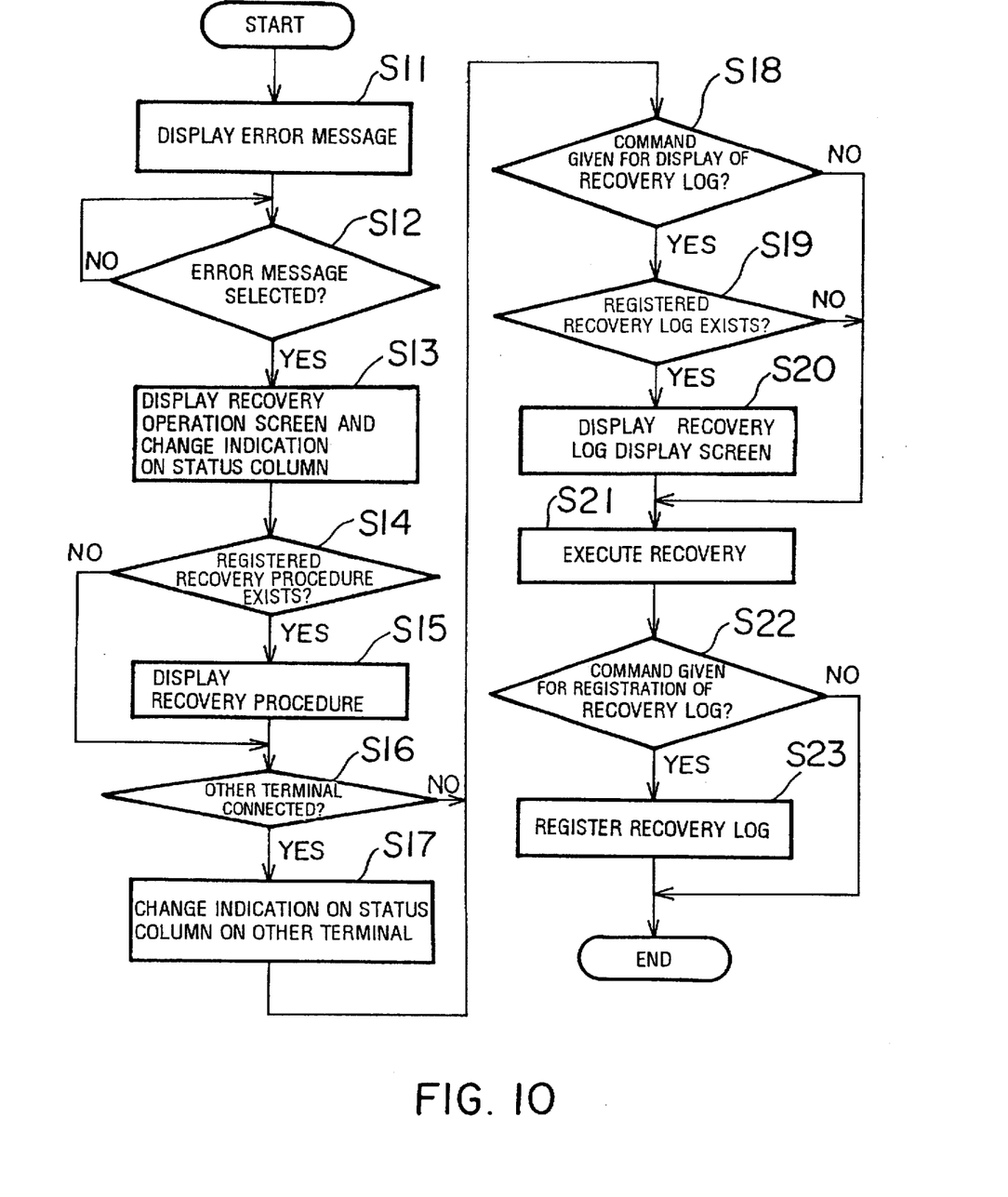
FIG. 10 is a flowchart showing procedures of processing executed by the centralized supervisor unit for recovery from a fault notified by an error message.

FIG. 10 shows a program of processing executed by the centralized supervisor unit 10 for recovery from a fault in response to an error message. This program is started upon reception of an error message from any of the computers.

[S11] The error message is displayed on the error message display screen 50 of each of the display devices 11a, 12a, 13a of the terminal units 11, 12, 13.

[S12] It is judged whether an error message has been selected for recovery from a fault notified thereby. If the selection is effected, the program proceeds to a step S13, whereas if not, the step S12 is repeatedly carried out.

[S13] The recovery operation screen 51 is displayed on the display screen of a terminal unit at which the selection of the error message is effected, and at the same time, an indication on a corresponding area of the status column 50a is changed over.

[S14] It is determined whether or not there is a recovery procedure for the error message registered in the hard disk drive 15. If there is the registered recovery procedure, the program proceeds to a step S15, whereas if not, the program proceeds to a step S16.

[S15] The recovery procedure is read from the hard disk drive 15, and displayed on the recovery operation screen 51.

[S16] It is determined whether or not any terminal unit other than the present terminal unit via which the recovery operation is being carried out is connected to the centralized supervisor unit 10. If there is any other terminal unit connected to the centralized supervisor unit 10, the program proceeds to a step S17, whereas if not, the program proceeds to a step S18.

[S17] An indication on a corresponding area of the status column of the error message display screen displayed on the display device of a terminal unit other than the present unit is changed over.

[S18] It is determined whether or not a command is given for displaying recovery log, i.e. a log of the previous recovery operation. If the command is given, the program proceeds to a step S19, whereas if not, the program proceeds to a step S21.

[S19] It is determined whether or not there exits the recovery log, which is commanded for display, registered in the hard disk drive 15. If the registered recovery log exits, the program proceeds to a step S20, whereas if not, the program proceeds to the step S21.

[S20] The recovery log display screen 52 is displayed.

[S21] The operator is permitted to execute the recovery.

[S22] After executing the recovery, it is determined whether or not a command is given for registering a log of the recovery. If the command for registration is given, the program proceeds to a step S23, whereas if not, the present program is terminated.

[S23] The log of the recovery commanded for registration is registered into the hard disk drive 15.

Thus, according to the present embodiment, fault messages and classifications thereof are displayed on the display devices 11a, 12a, 13a of the terminal units 11, 12, 13, connected to the centralized supervisor unit 10, which enables each operator to promptly recognize the fault messages.

Further, according to the present embodiment, a recovery procedure corresponding to an error message is displayed on the screen, which enables the operator to execute the recovery promptly and properly irrespective of his skill.

Further, according to the present embodiment, a log of a recovery can be registered, and further the log of the recovery can be referred to on a subsequent occasion for carrying out recovery from the same fault, which enables the operator to carry out the recovery more promptly and permits succession to know-how of the recovery.

Further, according to the present embodiment, on each of the display devices 11a, 12a, 13a of the terminal units 11, 12, 13, there is displayed the present status of processing in response to the error message, such as "FAULT" or "RECOVERING", which enables each operator attending on a terminal unit to recognize the status of the processing. This makes it possible to avoid overlapping of interventions on the same error message.

Further, although the recovery procedure display screen 51 is displayed in the form of a window according to the present embodiment, this is not limitative, but a switching display method or a division display method may be employed.

As described heretofore, error messages corresponding to respective faults are displayed together with classification data thereof, and a recovery procedure for recovery from a fault corresponding to one of the error messages selected by the operator is displayed on a display screen. According to the recovery procedure displayed, a recovery is carried out through operations of the operator, and a history of a procedure of the recovery is stored. One of stored recovery histories is selected for display through an operation of the operator, and the selected recovery history is displayed on the display screen. Therefore, it is possible to recognize a type of the fault and effect recovery from the fault, more promptly.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-supervising system including a centralized supervisor unit for supervising a large number of computers under supervision connected to each other via a network, said computer-supervising system comprising:

recovery procedure-storing means for storing a plurality of recovery procedures corresponding to a plurality of faults of said computers under supervision, respectively; message display means for displaying a plurality of error messages corresponding to said plurality of faults, respectively, on a display screen, together with a plurality of classification data added thereto by said computers under supervision;

fault-selecting means for selecting one of said plurality of error messages displayed on said display screen, according to an operation of an operator;

recovery procedure display means for reading one of said plurality of recovery procedures stored in said recovery procedure-storing means based on said selected one error message which corresponds to one of said plurality of faults, and for displaying said read one recovery procedure on said display screen;

recovery-executing means for executing said read and displayed one recovery procedure when instructed by an operator, to thereby recover from said one fault which corresponds to said selected one error message;

recovery history-storing means for storing said one recovery procedure actually executed by said recovery-executing means and for storing a plurality of executed recovery procedures executed by said recovery-executing means over time;

recovery history-selecting means for selecting one of said plurality of executed recovery procedures stored in said recovery history-storing means, according to an operation of said operator; and recovery history display means for displaying the selected one recovery procedure on said display screen.

2. A computer-supervising system according to claim 1, further including status display means for displaying a status of processing effected in response to each of said plurality of error messages.

3. A computer-supervising system according to claim 1, wherein said recovery procedure display means displays said read one recovery procedure on said display screen in the form of a window.

4. A computer-supervising system according to claim 1, wherein said recovery history display means displays said selected one recovery procedure on said display screen in the form of a window.

* * * * *